US012798538B2

(12) United States Patent
Travaglia et al.

(10) Patent No.: US 12,798,538 B2

(45) Date of Patent: Nov. 17, 2026

(54) PNEUMATIC ARRANGEMENT FOR A BRAKING SYSTEM

(71) Applicant: Volvo Truck Corporation, Gothenburg (SE)

(72) Inventors: Carlos Abilio Travaglia, Curitiba (BR); Lionel Farres, Heyrieux (SE); Andre Rodrigues, Curitiba (BR); Eduardo Miranda, Curitiba (BR); Guilherme Niro Machado, Colfax, NC (US)

(73) Assignee: Volvo Truck Corporation, Gothenburg (SE)

( * ) Notice: Subject to any disclaimer, the term of this patent is extended or adjusted under 35 U.S.C. 154(b) by 451 days.

(21) Appl. No.: 18/594,277

(22) Filed: Mar. 4, 2024

(65) Prior Publication Data

US 2024/0416884 A1 Dec. 19, 2024

(30) Foreign Application Priority Data

Mar. 16, 2023 (EP) .................................... 23162341

(51) Int. Cl.

*B60T 13/68* (2006.01)

*B60T 7/20* (2006.01)

(Continued)

(52) U.S. Cl.

CPC .............. *B60T 13/683* (2013.01); *B60T 7/20* (2013.01); *B60T 8/1708* (2013.01); *B60T 2270/88* (2013.01)

(58) Field of Classification Search

CPC .... B60T 13/683; B60T 13/385; B60T 13/263; B60T 7/20; B60T 8/1708; B60T 2270/88

See application file for complete search history.

(56) References Cited

U.S. PATENT DOCUMENTS 5,046,786 A 9/1991 Johnston et al.
8,197,014 B2 * 6/2012 Bensch .................. B60T 17/22 303/9.66

(Continued)

FOREIGN PATENT DOCUMENTS

DE 102006041009 A1 3/2008
EP 2757011 A1 7/2014

(Continued)

OTHER PUBLICATIONS

Certificate of Correction for U.S. Pat. No. 5,046,786, dated Sep. 10, 1991, 3 pages.

(Continued)

*Primary Examiner* — Thomas W Irvin

(74) *Attorney, Agent, or Firm* — Withrow & Terranova, PLLC

(57) ABSTRACT

A pneumatic arrangement for a braking system of a vehicle, the pneumatic arrangement comprising a manually controllable brake actuator, a trailer parking brake outlet connectable to a parking brake cylinder of the at least one trailer unit, a tractor parking brake outlet connectable to a parking brake cylinder of the tractor unit, a first valve arrangement, and a second valve arrangement, wherein the pneumatic arrangement is operable to assume a parking brake mode in which the first valve arrangement is controlled to arrange the tractor parking brake outlet in fluid communication with an air outlet, and the second valve arrangement is controlled to arrange the trailer parking brake outlet in fluid communication with the air outlet.

20 Claims, 5 Drawing Sheets

(51) Int. Cl.
*B60T 8/17* (2006.01)
*B60T 13/26* (2006.01)

(56) References Cited

U.S. PATENT DOCUMENTS

| | | | | |
|---|---|---|---|---|
| 11,491,963 | B2 * | 11/2022 | Van Thiel | B60T 13/26 |
| 11,541,856 | B2 * | 1/2023 | Schmidt | B60T 8/327 |
| 11,590,951 | B2 * | 2/2023 | Van Thiel | B60T 13/683 |
| 11,807,208 | B2 * | 11/2023 | Van Thiel | B60T 15/027 |
| 12,109,985 | B2 * | 10/2024 | Klostermann | B60T 13/683 |
| 12,263,821 | B2 * | 4/2025 | Van Thiel | B60T 8/171 |
| 2009/0256416 | A1 * | 10/2009 | Bensch | B60T 13/683 303/17 |
| 2020/0139952 | A1 * | 5/2020 | Van Thiel | B60T 13/385 |
| 2020/0247381 | A1 * | 8/2020 | Van Thiel | B60T 13/26 |
| 2021/0001824 | A1 | 1/2021 | Schmidt et al. | |
| 2022/0227342 | A1 * | 7/2022 | Klostermann | B60T 8/171 |
| 2024/0375627 | A1 * | 11/2024 | van Thiel | B60T 7/20 |
| 2025/0187576 | A1 * | 6/2025 | van Thiel | B60T 13/385 |
| 2026/0061977 | A1 * | 3/2026 | Miranda | B60T 8/171 |

FOREIGN PATENT DOCUMENTS

| | | | |
|---|---|---|---|
| EP | 2911924 | A1 | 9/2015 |
| WO | 2018172333 | A1 | 9/2018 |
| WO | 2019068393 | A1 | 4/2019 |

OTHER PUBLICATIONS

Extended European Search Report for European Patent Application No. 23162341.4, mailed Sep. 8, 2023, 7 pages.

* cited by examiner

PNEUMATIC ARRANGEMENT FOR A BRAKING SYSTEM

PRIORITY APPLICATIONS

The present application claims priority to European Patent Application No. 23162341.4, filed on Mar. 16, 2023, and entitled "PNEUMATIC ARRANGEMENT FOR A BRAKING SYSTEM," which is incorporated herein by reference in its entirety.

TECHNICAL FIELD

The disclosure relates generally to braking systems for vehicle combinations comprising a tractor unit and at least one trailer unit. In particular aspects, the disclosure relates to a pneumatic arrangement for a braking system. The disclosure can be applied to heavy-duty vehicles, such as trucks, buses, and construction equipment, among other vehicle types prepared to tow trailers or equivalents provided with parking brakes. Although the disclosure may be described with respect to a particular vehicle, the disclosure is not restricted to any particular vehicle.

BACKGROUND

Pneumatic braking systems of vehicles is conventional technology. The vehicle commonly comprises a number of pneumatically controlled brake cylinders acting as service brakes and/or parking brakes. For a vehicle comprising a tractor unit and at least one trailer unit, both the tractor unit as well as the trailer unit is provided with brake cylinders for obtaining a braking functionality for the entire vehicle combination.

However, in order to enable for different braking modes during various vehicle operating modes, there is a desire to further improve the braking systems. In particular, there is a desire to further develop the braking systems to apply the correct type of brakes in a sufficient manner for the various braking modes, and to provide a pneumatic arrangement that enables for such mode selection in a simple manner.

SUMMARY

According to a first aspect of the disclosure, there is provided a pneumatic arrangement for a braking system of a vehicle comprising a tractor unit and at least one trailer unit, the pneumatic arrangement comprising a manually controllable brake actuator, a trailer parking brake outlet connectable to a pneumatically controlled parking brake cylinder of the at least one trailer unit, a tractor parking brake outlet connectable to a pneumatically controlled parking brake cylinder of the tractor unit, a first valve arrangement connected to, and controllable by, the manually controllable brake actuator, the first valve arrangement comprising at least one valve connected to the trailer parking brake outlet, the tractor parking brake outlet, an air inlet and an air outlet of the pneumatic arrangement, and a second valve arrangement connected to, and controllable by, the manually controllable brake actuator, the second valve arrangement comprising at least one valve connected to the air outlet of the pneumatic arrangement and connected between the first valve arrangement and the trailer parking brake outlet, wherein, upon actuation of the manually controllable brake actuator, the pneumatic arrangement is operable to assume a parking brake mode in which the first valve arrangement is controlled to arrange the tractor parking brake outlet in fluid communication with the air outlet, and the second valve arrangement is controlled to arrange the trailer parking brake outlet in fluid communication with the air outlet.

The above described manually controllable brake actuator should preferably, although not exclusively, be construed as an electronic brake actuator. The manually controllable brake actuator is preferably connected to a control unit which is configured to receive data, or a signal, from the manually controllable brake actuator which data/signal is indicative of a desired braking action from the operator of the vehicle. Further, the pneumatic arrangement described above may be advantageously suitable for brake cylinders which are applied upon releasing pressurized air therefrom. In other words, the brake cylinders are advantageously released when exposed to an air pressure above a certain threshold. The first valve arrangement may preferably be arranged in fluid communication with the air inlet to feed pressurized air to the trailer parking brake outlet when engaging the trailer parking brake.

A technical benefit of the first aspect of the disclosure may be that an arrangement is provided which can apply and release the parking brakes of both the trailer unit as well as the tractor unit from inside the cabin, i.e. when sitting on the seat within the cabin. In other words, by actuation of the manually controllable brake actuator, all parking brakes of the vehicle combination, i.e. the truck and the at least one trailer, can be activated simultaneously without the operator having to leave the cabin, after the actuation of the tractor parking brake, for a manual activation of the trailer parking brake outside the vehicle. The first aspect of the disclosure may thus be particularly advantageous for implementation in braking systems for vehicles operable at jurisdictions or positions requiring a certain high-level parking brake functionality.

Optionally, the pneumatic arrangement may be operable to assume the parking brake mode upon actuation of the manually controllable brake actuator when a vehicle speed is below a predetermined threshold speed. A technical benefit may include that the parking brakes of the tractor unit and the parking brakes of the at least one trailer unit is solely applied when the vehicle is at a low speed. Preferably, the vehicle should be at stand still, i.e. at a vehicle speed of zero, to assume the parking brake mode upon actuation of the manually controllable brake actuator. The predetermined threshold speed may also be a low speed such as when the vehicle is crawling.

Optionally, the at least one valve of the second valve arrangement may be a normally open solenoid valve. A technical benefit may be that the at least one valve may be closed only upon receiving a control signal. Accordingly, the wording "normally open" should be construed such that the valve is open to allow pneumatic fluid to flow therethrough when not being acted upon by e.g. a control signal or a pneumatic pressure. Hereby, a rapid engagement of the parking brake cylinder of the at least one trailer unit may be obtained when the pneumatic arrangement assumes the parking brake mode. Also, an improved system functionality is obtained since the solenoid valve solely needs to be actively closed during the below described secondary brake mode.

Optionally, the second valve arrangement may comprise a second valve, the second valve being a relay valve arranged in fluid communication between the at least one valve and the trailer parking brake outlet. Preferably, the relay valve is controlled by the at least one valve of the second valve arrangement. Also, the relay valve may also preferably be arranged in fluid communication with the air inlet.

Optionally, the relay valve may be configured to fluidly connect the trailer parking brake outlet to the air outlet when the relay valve assumes a closed position. A technical benefit may include that the relay valve can enable for a rapid flow of pressurized air from the trailer parking brake outlet to the air outlet, and thereby provide for a rapid engagement of the trailer parking brake.

Optionally, the first valve arrangement may comprise a first set of valves and a release valve, wherein the tractor parking brake outlet is arranged in fluid communication with the air outlet via the release valve when the pneumatic arrangement assumes the parking brake mode. A technical benefit may include that the first set of valves can control the position of the release valve. Hence, the release valve can be controlled to assume a wide variety of positions by controlling the first set of valves in suitable manners.

Optionally, upon de-activation of the manually controllable brake actuator, the first valve arrangement may be controlled to disconnect the tractor parking brake outlet from the air outlet, and the second valve arrangement is controlled to disconnect the trailer parking brake outlet from the air outlet. The de-activation of the manually controllable brake actuator may be realized by the operator pushing the actuator, i.e. in a similar manner as when actuating the actuator, or by moving the actuator in an opposite direction compared to the actuation thereof. The de-activation should thus be construed as an action which is subsequent to the actuation of the manually controllable brake actuator. A technical benefit may include that the parking brakes of the tractor unit as well as the trailer unit are rapidly released.

Optionally, the pneumatic arrangement further may comprise a trailer service brake outlet connectable to a pneumatically controlled service brake cylinder of the trailer unit. The wording “trailer service brake outlet connectable to a pneumatically controlled service brake cylinder” may, according to a non-limiting example, be construed as the trailer service brake outlet is connectable to the pneumatically controlled service brake cylinder via an additional components, such as e.g. a trailer control module. In such a case, the trailer control module may control actuation of the pneumatically controlled service brake cylinder when receiving a signal from e.g. an operator that the trailer service brake should be applied. A technical benefit of the trailer service brake outlet may include that also the service brakes of the trailer can be controllable by the pneumatic arrangement.

Optionally, the trailer service brake outlet may be connected to the first valve arrangement.

Optionally, the pneumatic arrangement may be configured to assume a secondary brake mode in which the first valve arrangement is controlled to direct pressurized fluid from the trailer service brake outlet. The secondary brake mode should preferably be understood to mean a mode that can be assumed by the pneumatic arrangement during driving. Accordingly, and in some examples, the pneumatic arrangement may be configured to assume the secondary brake mode upon actuation of the manually controllable brake actuator when a vehicle speed is above a predetermined threshold speed. The secondary brake mode may thus advantageously be applied during driving when the conventional braking system of the vehicle for some reason is malfunctioning.

Optionally, the first valve arrangement may be controlled to arrange the tractor parking brake outlet in fluid communication with the air outlet when the pneumatic arrangement assumes the secondary brake mode. A technical benefit may be that pressurized air is exhausted from the brake cylinders of the tractor unit, thereby applying the parking brakes of the tractor unit.

Optionally, the normally open solenoid valve may be controlled to assume a closed position when the pneumatic arrangement assumes the secondary brake mode. A technical benefit may include that the trailer parking brake outlet can be isolated from the first valve arrangement during the secondary brake mode.

Optionally, the relay valve may be controlled to assume an open position to maintain an air pressure in the trailer parking brake outlet when the pneumatic arrangement assumes the secondary brake mode. A technical benefit may include that the parking brake cylinders of the at least one trailer unit is not actuated.

Optionally, the pneumatic arrangement may further comprise a pressure sensor connected to the trailer parking brake outlet. A technical benefit may include that the pressure in the trailer parking brake outlet may be obtained to verify that the pneumatic arrangement is operable as intended during the above described parking brake mode and the secondary brake mode.

Accordingly, and optionally, the pressure sensor may be configured to transmit a signal to an upper layer control unit when a pressure level in the trailer parking brake outlet exceeds a predetermined threshold limit during the secondary brake mode.

Optionally, the first valve arrangement may be an electrically controlled valve arrangement operable upon receiving an electronic control signal. The electronic control signal may preferably be received from a control unit, such as a vehicle control unit, a brake control unit, etc. The control signal is preferably transmitted to the first valve arrangement upon actuation of the manually controllable brake actuator.

Optionally, the second valve arrangement may be an electrically controlled valve arrangement operable upon receiving an electronic control signal upon manual actuation by the manually controllable actuator. In a similar vein as for the first valve arrangement, the electronic control signal may preferably be received from a control unit, such as a vehicle control unit, a brake control unit, etc. The control signal is preferably transmitted to the second valve arrangement upon actuation of the manually controllable brake actuator.

According to second aspect of the disclosure, there is provided a braking system for a vehicle, the braking system comprises a pneumatic arrangement according to any one of the above described examples in relation to the first aspect, at least one trailer parking brake comprising a pneumatically controlled parking brake cylinder connected to the trailer parking brake outlet, and at least one tractor parking brake comprising a pneumatically controlled parking brake cylinder connected to the tractor parking brake outlet.

According to third aspect of the disclosure, there is provided a vehicle comprising a braking system according to the above described second aspect.

Effects and features of the second and third aspect are largely analogous to those described above in relation to the first aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The disclosure described in the following may seek to mitigate the problem of insufficient braking capacity during various operating conditions. A technical benefit may thus include that the parking brakes of the tractor unit as well as the parking brakes of at least one trailer unit can be applied simultaneously from an operator actuating a manually controllable brake actuator from inside the cabin.

Figure 1:
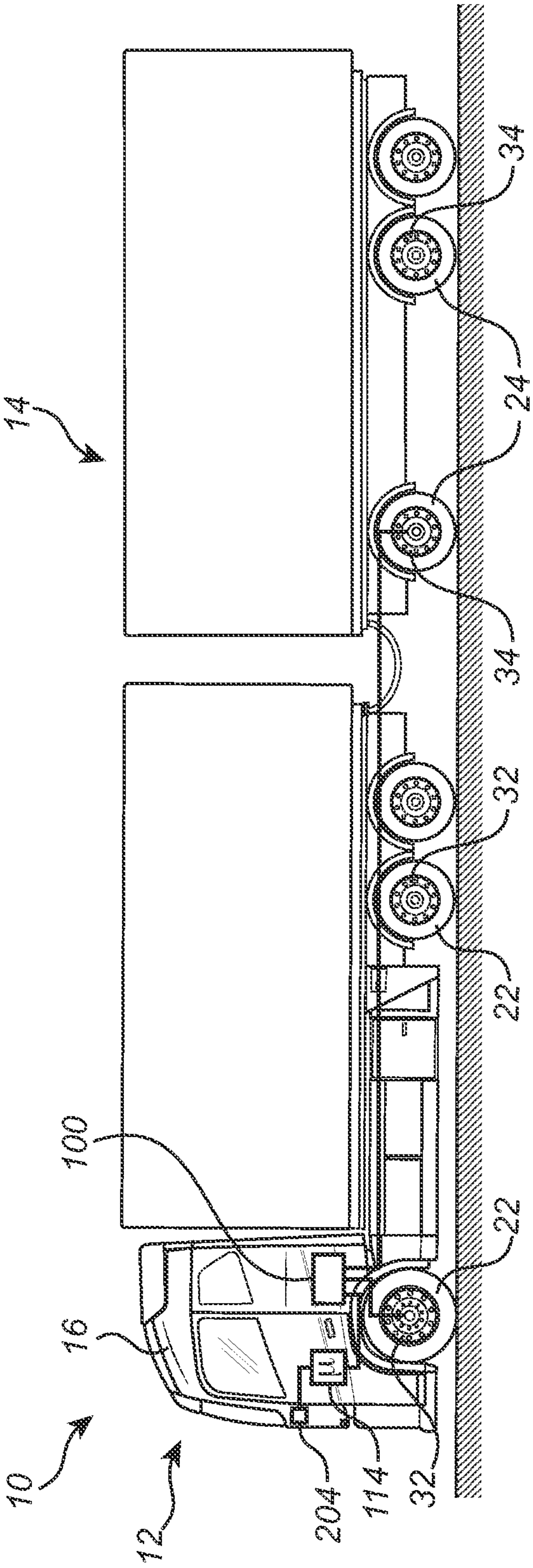
FIG. 1 is an exemplary illustration of a vehicle in the form of a truck according to an example.

Initial reference is made to FIG. 1 which is an exemplary illustration of a vehicle 10 in the form of a truck according to an example. The vehicle 10 depicted in FIG. 1 comprises a tractor unit 12 and a trailer unit 14. The tractor unit 12 comprises a cabin 16 in which an operator can control operation of the vehicle 10. Although FIG. 1 only illustrates a single trailer unit 14, it should be readily understood that the present disclosure described below is applicable for a vehicle 10 comprising more than a single trailer unit, such as two or more trailers connected behind the tractor unit 12. The vehicle 10 may also comprise a dolly between the tractor unit 12 and the trailer unit 14.

The vehicle 10 further comprises a pneumatic arrangement 100. The pneumatic arrangement 100 is connected to a braking system (202 in FIG. 2). In detail, the pneumatic arrangement 100 is preferably configured to control the flow of pneumatic fluid to/from brake cylinders of the braking system which will be further described below in relation to the description of FIGS. 2-4. In FIG. 1, the pneumatic arrangement 100 is coupled to a parking brake cylinder 32 of the tractor unit 12, which parking brake cylinder 32 is arranged on a wheel 22 of the tractor unit 12. The pneumatic arrangement 100 is also coupled to parking brake cylinder 34 of the trailer unit 14, which parking brake cylinder 34 is arranged on a wheel 24 of the trailer unit 14.

The pneumatic arrangement 100 further comprises a control unit 114 configured to at least control operation of the pneumatic arrangement 100. The pneumatic arrangement 100 also comprises a manually controllable brake actuator 204 arranged inside the cabin 16 of the vehicle 10. An operator of the vehicle 10 can thus, from inside the cabin 16, actuate the manually controllable actuator 204 when there is a desire to obtain a braking operation for the braking system of the vehicle 10.

The control unit 114 may comprise processing circuitry which may include a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with an upper layer control unit (not shown).

Figure 2:
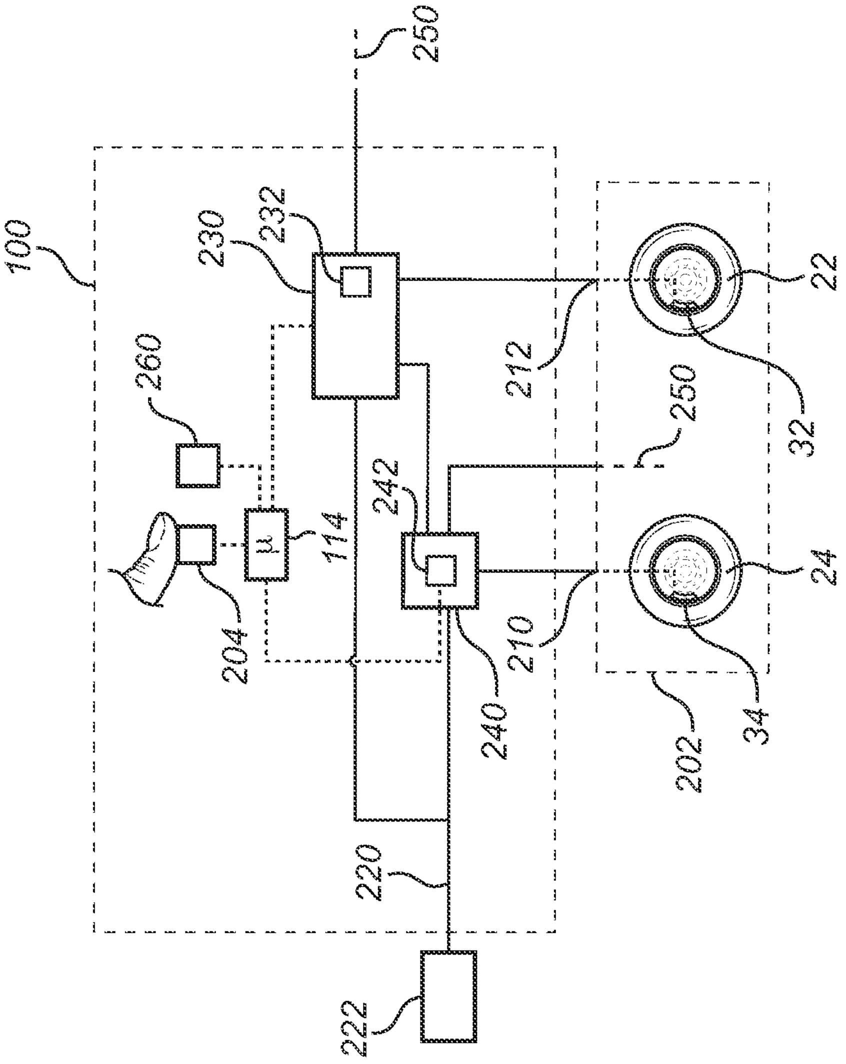
FIG. 2 is a schematic illustration of a pneumatic arrangement according to an example.

In order to describe the pneumatic arrangement 100 in further detail, reference is made to FIGS. 2-5 which illustrate examples of such pneumatic arrangement 100. Starting with FIG. 2 which is a schematic illustration of the pneumatic arrangement 100 according to an example. As can be seen in FIG. 2, the pneumatic arrangement 100 is coupled to the braking system 202 as also indicated above. As also described above, the pneumatic arrangement 100 comprises the manually controllable brake actuator 204. The manually controllable brake actuator 204 may e.g. be a push button arranged inside the cabin 16 of the vehicle 10, a touchable app on a screen inside the vehicle, etc.

The pneumatic arrangement 100 further comprises trailer parking brake outlet 210 and a tractor parking brake outlet 212. The trailer parking brake outlet 210 is connected to the parking brake cylinder 34 of the trailer unit 14 and the tractor parking brake outlet 212 is connected to the parking brake cylinder 32 of the tractor unit 12. In detail, the trailer parking brake outlet 210 is arranged in fluid connection with the parking brake cylinder 34 of the trailer unit 14, and the tractor parking brake outlet 212 is arranged in fluid connection with the parking brake cylinder 32 of the tractor unit 12.

The pneumatic arrangement 100 also comprises an air inlet 220 for receiving pressurized fluid into the pneumatic arrangement 100. The pressurized fluid will in the following also be referred to as pressurized air. The air inlet 220 is preferably coupled to a pneumatic energy source 222, i.e. a source of pressurized air. Moreover, the pneumatic arrangement 100 comprises a first valve arrangement 230. The first valve arrangement 230 is connected to, and controllable by, the manually controllable brake actuator 204. Thus, when the operator actuates the manually controllable brake actuator 204, the first valve arrangement 230 is controlled based on e.g. a current vehicle operation as will be described further below. In further detail, the first valve arrangement 230 is preferably operable by receiving a control signal from the control unit 114. The manually controllable brake actuator 204 is preferably coupled to the control unit 114 and upon actuation of the manually controllable brake actuator 204, data is transmitted to the control unit 114. The data includes instructions for the control unit 114 to control the first valve arrangement. The first valve arrangement 230 comprises at least one valve 232 which is connected to the trailer parking brake outlet 210, via the below described second valve arrangement 240, the tractor parking brake outlet 212, the air inlet 220 and to an air outlet 250 of the pneumatic arrangement 100.

Further, the pneumatic arrangement 100 also comprises a second valve arrangement 240. The second valve arrangement 240 is connected to, and controllable by, the manually controllable brake actuator 204. Thus, when the operator actuates the manually controllable brake actuator 204, the second valve arrangement 240 is controlled based on e.g. a current vehicle operation as will be described further below. In further detail, the second valve arrangement 240 is preferably operable by receiving a control signal from the control unit 114. As described above, the manually controllable brake actuator 204 is preferably coupled to the control unit 114. Upon actuation of the manually controllable brake actuator 204, data is transmitted to the control unit 114. The data includes instructions for the control unit 114 to control the second valve arrangement. Further, the second valve arrangement 240 comprises at least one valve 242 which is connected to the air inlet 220 and the air outlet 250 of the pneumatic arrangement. The at least one valve 242 of the second valve arrangement 240 is also connected between the first valve arrangement 230 and the trailer parking brake outlet 210.

The brake cylinders 32, 34 or the tractor unit 12 and the trailer unit 14 are preferably engaged when pressurized air is exhausted from the respective cylinders. In other words, when pressurized air is provided to the brake cylinders, they are disengaged to allow a rotation of the wheels they are connected to. When air is exhausted from the brake cylinders, the brakes engage and prevent, or at least partially prevent, a rotation of the wheel they are connected to.

The pneumatic arrangement 100 is operable to assume a parking brake mode. The pneumatic arrangement 100 assumes the parking brake mode upon actuation of the manually controllable brake actuator 100. Preferably, a vehicle speed of the vehicle 10 should be below a predetermined threshold speed for the pneumatic arrangement 100 to assume the parking brake mode. The control unit 114 may therefore preferably receive data indicative of a current vehicle speed from a vehicle speed sensor 260. The vehicle speed sensor 260 may be the same sensor transmitting vehicle speed information to the operator of the vehicle 10, or receive vehicle speed information from such sensor.

When the pneumatic arrangement 100 assumes the parking brake mode, the first valve arrangement 230 is controlled to arrange the tractor parking brake outlet actuator in fluid communication with the air outlet 250. Also, the second valve arrangement 240 is controlled to arrange the trailer parking brake outlet 210 in fluid communication with the air outlet 250. Hereby, pressurized air is exhausted from the parking brake cylinder 34 of the trailer unit 14 to the air outlet 250, whereby the parking brake cylinder 34 of the trailer unit 14 is engaged to brake the wheel 24 or the trailer. In a similar vein, pressurized air is exhausted from the parking brake cylinder 32 of the tractor unit 12 to the air outlet 250, whereby the parking brake cylinder 32 of the tractor unit 12 is engaged to brake the wheel 22 of the tractor unit.

The first valve arrangement 230 is preferably controlled to arrange the tractor parking brake outlet 212 in fluid communication with the air outlet 250 by receiving instructions from the control unit 114. In a similar vein, the second valve arrangement 240 is preferably controlled to arrange the trailer parking brake outlet 210 in fluid communication with the air outlet 250 by receiving instructions from the control unit 114.

Moreover, upon de-activation of the manually controllable brake actuator 204, the first valve arrangement is controlled to disconnect the tractor parking brake outlet 212 from the air outlet 250. Also, the second valve arrangement 240 is controlled to disconnect the trailer parking brake outlet 210 from the air outlet 250. Pressurized air is hereby fed from the air inlet 220 to the tractor parking brake outlet 212 and to the trailer parking brake outlet 210 such that parking brake cylinders of the tractor unit 12 and the trailer unit 14 are released, whereby the vehicle can be driven to its next destination or stop.

Figure 3:
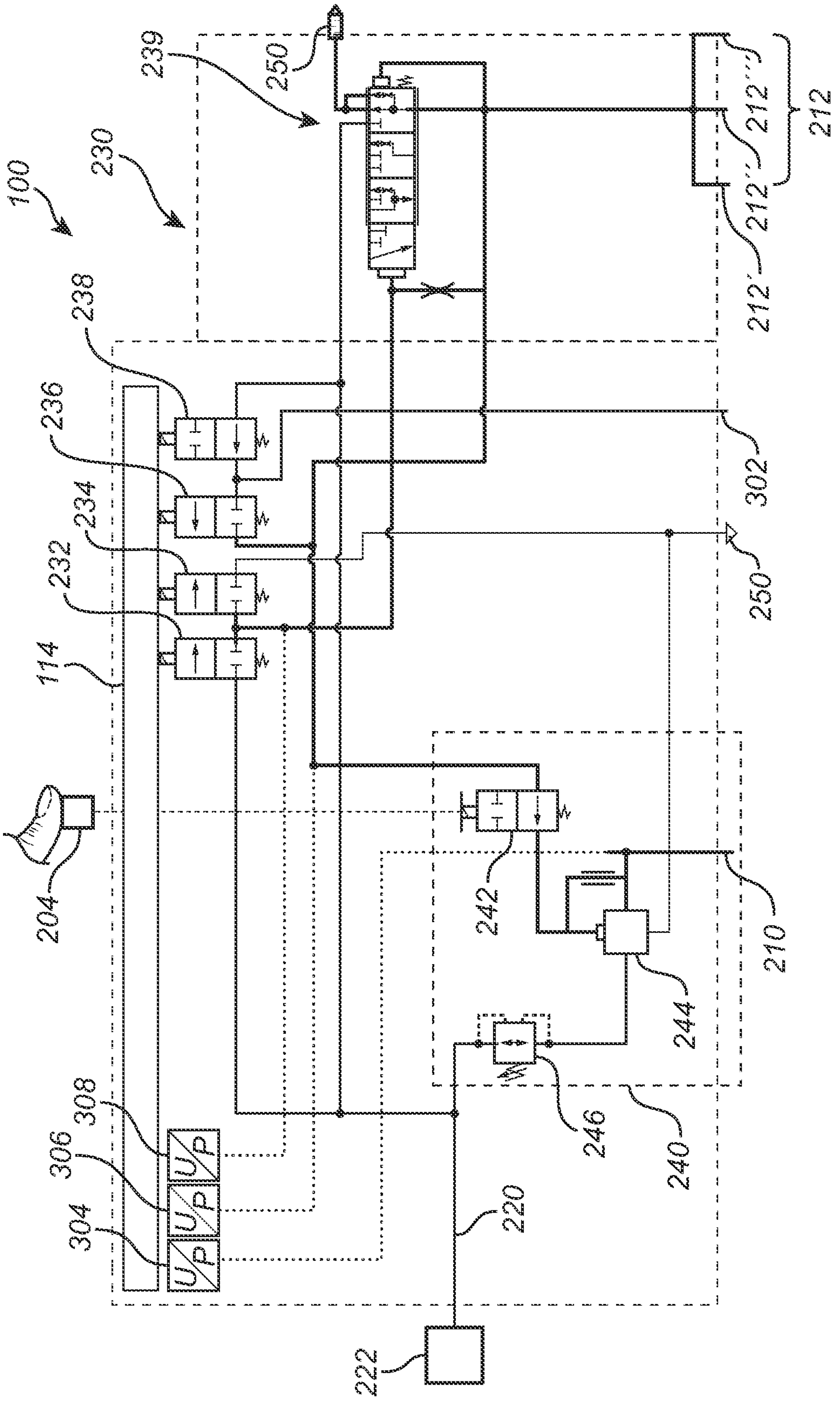
FIG. 3 is a schematic illustration of a pneumatic arrangement according to an example.

Reference is now made to FIG. 3 which is a schematic illustration of a pneumatic arrangement according to an example. In particular, the exemplified pneumatic arrangement 100 in FIG. 3 comprises the features described above in relation to the description of FIG. 2, although in further detail. Thus, the features described in relation to FIG. 2 are applicable for the FIG. 3 example unless described to the contrary. It should be readily understood that the pneumatic arrangement depicted in FIG. 3 as well as in FIGS. 4 and 5 may comprise further features, such as additional valves, conduits, etc. Such features are excluded from FIGS. 3-5 for simplifying for the reader of the present disclosure.

As exemplified in FIG. 3, the first valve arrangement 230 comprises a first set of valves 232, 234, 236, 238 and a release valve 239. In particular, the first set of valves comprises a first valve 232, a second valve 234, a third valve 236 and a fourth valve 238. As exemplified in FIG. 3, each of the first 232, second 234, third 236 and fourth 238 valves of the first set of valves is coupled to, and controlled by, the control unit 114. Further, the release valve 239 is configured to be arranged in a plurality of positions in response to an air pressure exposed thereto. In the example depicted in FIG. 3, the release valve 239 is configured to assume four different positions, of which the air flows in different directions within the pneumatic arrangement in response to the specific position of the release valve 239. Further, the tractor parking brake outlet 212 is arranged in fluid communication with the air outlet 250 via the release valve 239. As exemplified in FIG. 3, the tractor parking brake outlet 212 comprises three tractor parking brake outlets 212', 212", 212'''.

As further exemplified in FIG. 3, the at least one valve 242 of the second valve arrangement 240 is a solenoid valve 242. The solenoid valve 242 is exemplified as a normally open solenoid valve 242. In detail, the normally open solenoid valve 242 is arranged in an open position to allow air to flow therethrough unless receiving a control signal with instructions to close the solenoid valve to prevent air to flow therethrough. The second valve arrangement 240 also comprises a second valve 244. The second valve 244 is exemplified as a relay valve controlled by the solenoid valve 242, the relay valve is arranged in fluid communication between the solenoid valve 242 and the trailer parking brake outlet 210. As also illustrated, the relay valve is arranged in fluid communication with the air inlet 220. The relay valve 244 is further arranged in fluid communication with the air outlet 250. As will be further described below, pressurized fluid can flow from the trailer parking brake outlet 210 to the air outlet 250 via the relay valve 244. The solenoid valve 242 is preferably coupled to the control unit 114 and controlled in response to receiving control signal(s) from the control unit 114. As also depicted in FIG. 3, the second valve arrangement 240 also comprises an overflow valve 246 in fluid communication between the relay valve 244 and the air inlet 220.

The exemplified pneumatic arrangement 100 in FIG. 3 further comprises a trailer service brake outlet 302. The trailer service brake outlet 302 is connectable to a pneumatically controlled service brake cylinder (not shown) of the trailer unit 14. The service brake cylinder of the trailer unit 14 is preferably engaged, i.e. configured to apply the service brake, when air is exhausted to the air outlet. Hence, in a similar vein at the above described parking brake cylinders, the service brake cylinder is not applying a brake force on the wheel of the trailer unit 14 when pressurized by a flow of pressurized air. As can be seen in FIG. 3, the trailer service brake outlet 302 is arranged in fluid communication with the first valve arrangement 230. In detail, the trailer service brake outlet 302 is connected to the third 236 and fourth 238 valves of the first set of valves of the first valve arrangement 230.

As further depicted in FIG. 3, the exemplified pneumatic arrangement 100 also comprises a set of pressure sensors 304, 306, 308. More specifically, the set of pressure sensors comprises a first pressure sensor 304, a second pressure sensor 306, and a third pressure sensor 308. The first pressure sensor 304 is connected to the trailer parking brake outlet 210. The first pressure sensor 304 is configured to detect a pressure level in trailer parking brake outlet 210. The second pressure sensor 306 is connected to a conduit between the first valve arrangement 230 and the second valve arrangement 240. More specifically, the second pressure sensor 306 is configured to detect a pressure level in the conduit between the solenoid valve 242 and the release valve 239. The third pressure sensor 308 is connected to a position between the first 232 and second 234 valves of the first set of valves of the first valve arrangement 230. Hence, the third pressure sensor 308 is configured to detect a pressure level between the first 232 and second 234 valves of the first set of valves. The first, second and third pressure sensors are preferably connected to the control unit 114, whereby the control unit 114 is configured to transmit data to an upper layer control unit (not shown) in response to the respective pressure level falls outside a predetermined pressure range, whereby a decision for maintenance of the pneumatic arrangement may be taken.

Figure 4:
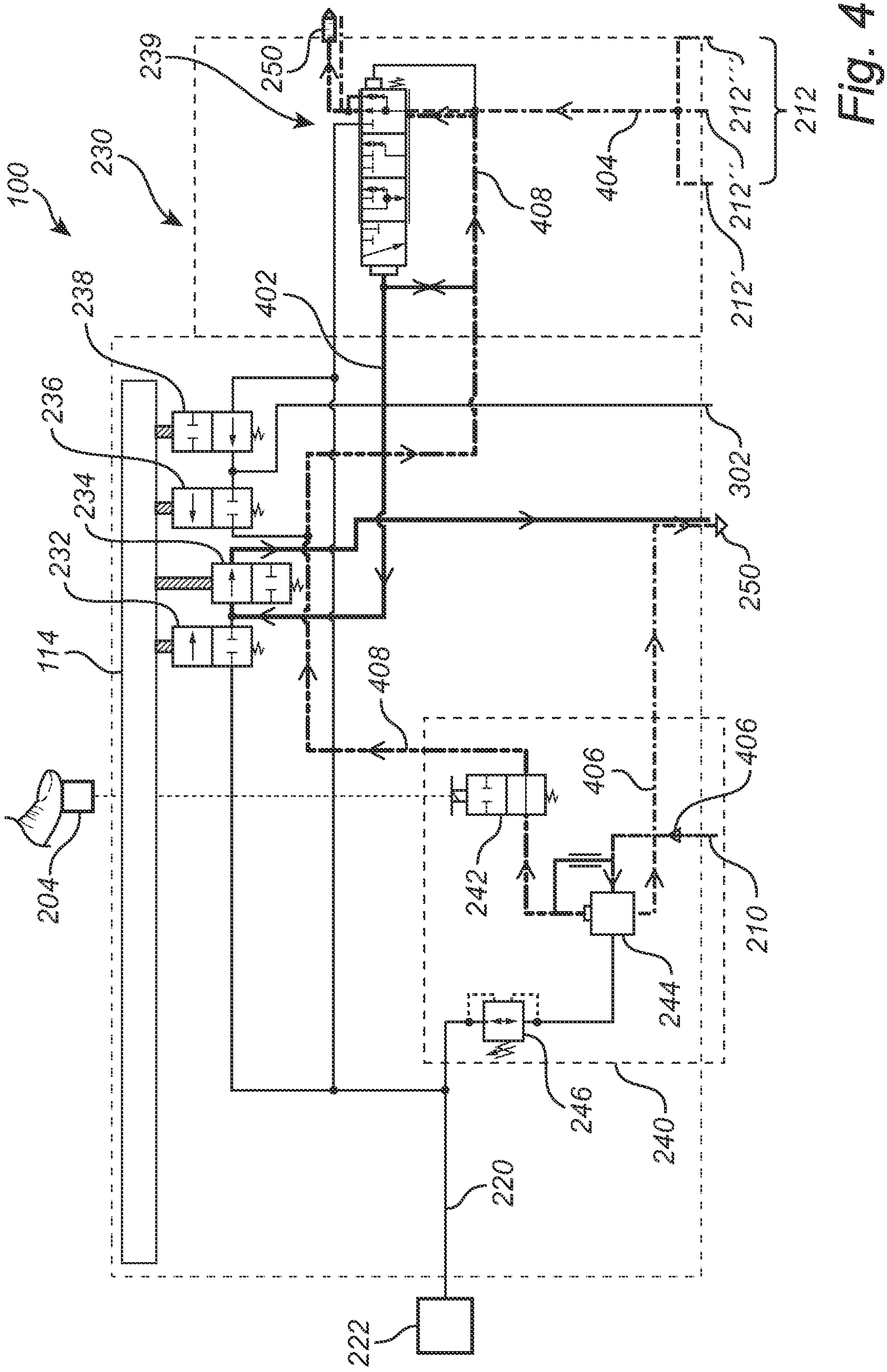
FIG. 4 is a schematic illustration of the FIG. 3 example detailing the pneumatic flow when assuming a parking brake mode.
Figure 5:
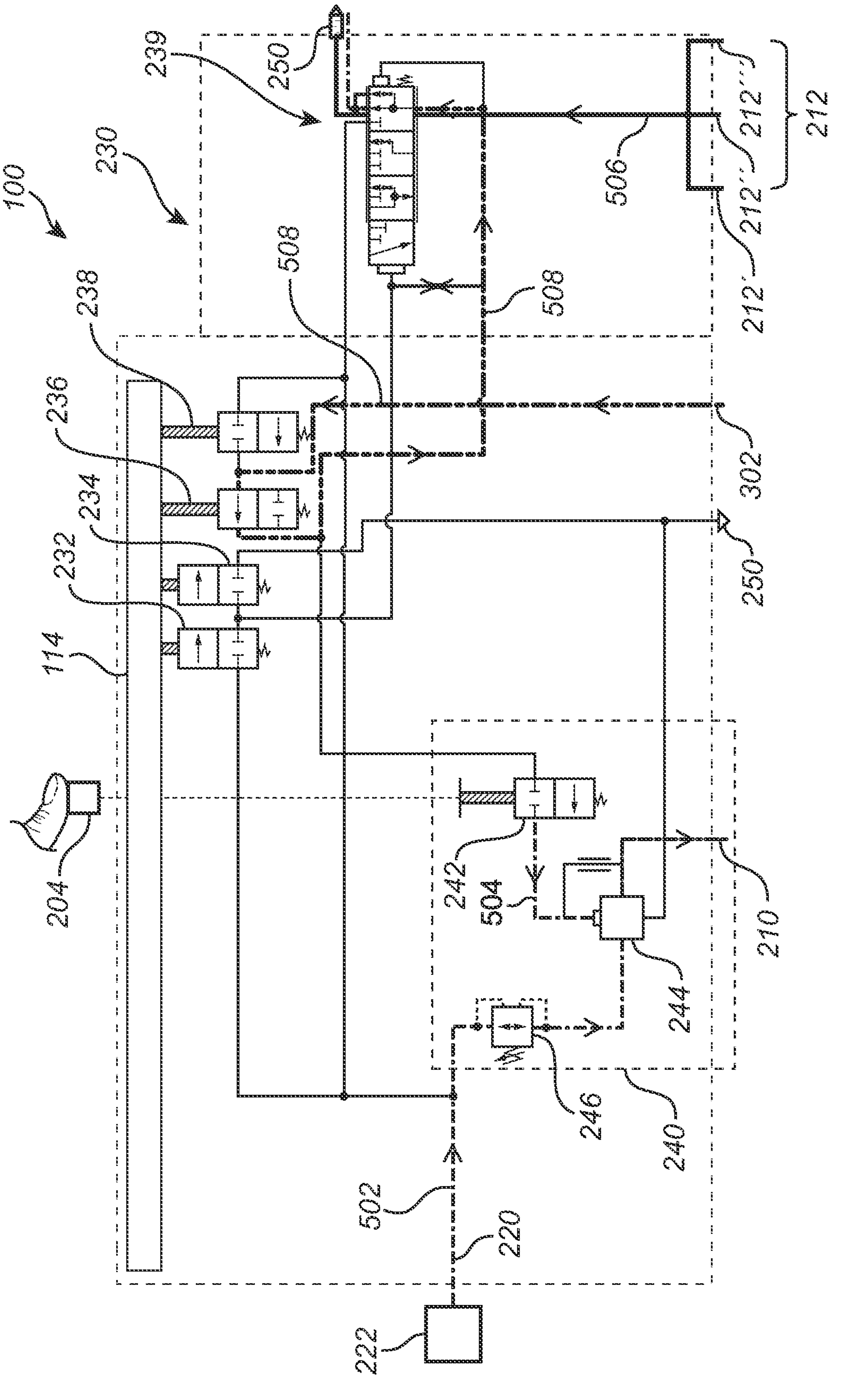
FIG. 5 is a schematic illustration of the FIG. 3 example detailing the pneumatic flow when assuming a secondary brake mode.

In order to describe the flow of pressurized air in the pneumatic arrangement 100 when the pneumatic arrangement assumes the parking brake mode, reference is now made to FIG. 4. In FIG. 4, the above described pressure sensors 304, 306, 308 are omitted to simplify the drawing for the reader.

As described above, when the manually controllable brake actuator 204 is actuated, and the vehicle speed of the vehicle 10 is below a predetermined threshold speed, preferably at stand still, the pneumatic arrangement 100 assumes the parking brake mode. More specifically, the control unit 114 controls the first 232 and second 234 valves of the first set of valves. In particular, the first valve 232 is controlled to prevent pressurized air from flowing therethrough, while the second valve 234 is controlled to allow pressurized air to flow therethrough. Pressurized air, indicated with reference numeral 402, from the release valve 239 flows through the second valve 234 and further to the air outlet 250. By the flow 402 of pressurized air, the release valve 239 is controlled to arrange the tractor parking brake outlet 212 in fluid communication with the air outlet 250. Pressurized air, indicated with reference numeral 404 is exhausted from the parking brake cylinder of the tractor unit 12 via the tractor parking brake outlet 212. Thus, pressurized air 404 from the parking brake cylinder of the tractor unit 12 is exhausted to the air outlet, whereby the parking brake cylinder of the tractor unit 12 is engaged.

Further, the relay valve 244 is controlled to direct pressurized air, indicated with reference numeral 408, from the relay valve 244 to the air outlet 250 via the release valve 239. The relay valve 244 is thus controlled to arrange the trailer parking brake outlet 210 in fluid communication with the air outlet 250. Pressurized air, indicated with reference numeral 406, from the parking brake cylinder of the trailer unit 14 is exhausted to the air outlet 250 whereby the parking brake cylinder of the trailer unit 14 is engaged.

Accordingly, by controlling the first 230 and second 240 valve arrangements as described above, the flow of air can be controlled as indicated with reference numerals 402, 404, 406, 408 to engage the parking brake cylinders of the tractor unit 12 and the trailer unit 14.

The pneumatic arrangement 100 described above is also configured to assume a secondary brake mode. In particular, when the operator actuates the manually controllable brake actuator 204 and the vehicle speed is above the predetermined threshold speed. In particularly, the first valve arrangement 230 is controlled to direct pressurized air from the trailer service brake outlet 302 to the air outlet 250 to thereby engage the service brake cylinder of the trailer unit 14. During the secondary brake mode, the first valve arrangement 230 is also controlled to arrange the tractor parking brake outlet 212 in fluid communication with the air outlet 250 to thereby also engage the parking brake cylinders of the tractor unit 12.

In further detail, when the pneumatic arrangement 100 assumes the secondary brake mode, the third 236 and fourth 238 valves of the first set of valves are controlled by the control unit 114. More specifically, the third valve 236 is controlled to allow pressurized air to flow therethrough, while the fourth valve 238 is controlled to prevent pressurized air to flow therethrough. Moreover, when assuming the secondary brake mode, it has been realized that it is beneficial to keep the parking brake cylinder of the trailer unit 14 disengaged, i.e. now applied. Therefore, the control unit 114 further controls the normally open solenoid valve 242 to be closed, i.e. to prevent pressurized air to flow therethrough.

When the pneumatic arrangement 100 assumes the secondary brake mode, the solenoid valve 242 is, as described above, closed the relay valve 244 is open. Pressurized air, indicated with reference numeral 502, is fed from the air inlet 220, through the overflow valve 246, the relay valve 244 and to the trailer parking brake outlet 210. There is thus no pressure drop at the trailer parking brake outlet 210 and the parking brake cylinder of the trailer unit 14 is thus disengaged. Any pressurized air, indicated with reference numeral 504, present in the flow line between the solenoid valve 242 and the relay valve 244 will keep the relay valve 244 opened. Thus, the air inlet 220 is in fluid communication with the trailer parking brake outlet 210.

Further, the release valve 239 is controlled to assume the same position as described above in relation to the parking brake mode. Hereby, pressurized air, indicated with reference numeral 506, is exhausted from the parking brake cylinder of the tractor unit 12 via the tractor parking brake outlet 212. Thus, pressurized air 506 from the parking brake cylinder of the tractor unit 12 is exhausted to the air outlet 250, whereby the parking brake cylinder of the tractor unit 12 is engaged.

Also, since the third 236 and fourth 238 valves are controlled as described above, air pressure in the trailer service brake outlet 302 will decrease since the pressurized air, indicated with reference numeral 508, from the service brake cylinder of the trailer unit 14 will flow through the third valve 236 and thereafter to the release valve 239 where the pressurized air 508 is exhausted to the air outlet 250.

To verify that the solenoid valve 242 is closed the first pressure sensor 304 described above in relation to FIG. 3 monitors the pressure level of the trailer parking brake outlet 210 and transmits a signal to an upper layer control unit when a pressure level in the trailer parking brake outlet 210 exceeds a predetermined threshold limit during the secondary brake mode. Hence, a potential malfunction can be rapidly identified.

EXAMPLE LIST

Example 1: A pneumatic arrangement for a braking system of a vehicle comprising a tractor unit and at least one trailer unit, the pneumatic arrangement comprising: a manually controllable brake actuator, a trailer parking brake outlet connectable to a pneumatically controlled parking brake cylinder of the at least one trailer unit, a tractor parking brake outlet connectable to a pneumatically controlled parking brake cylinder of the tractor unit, a first valve arrangement connected to, and controllable by, the manually controllable brake actuator, the first valve arrangement comprising at least one valve connected to the trailer parking brake outlet, the tractor parking brake outlet, an air inlet and an air outlet of the pneumatic braking system, and a second valve arrangement comprising at least one valve connected to, and controllable by, the manually controllable brake actuator, the second valve arrangement being connected to the air outlet of the pneumatic braking system and connected between the first valve arrangement and the trailer parking brake outlet, wherein, upon actuation of the manually controllable brake actuator, the pneumatic arrangement is operable to assume a parking brake mode in which the first valve arrangement is controlled to arrange the tractor parking brake outlet in fluid communication with the air outlet, and the second valve arrangement is controlled to arrange the trailer parking brake outlet in fluid communication with the air outlet.

Example 2: The pneumatic arrangement of example 1, wherein the pneumatic arrangement is operable to assume the parking brake mode upon actuation of the manually controllable brake actuator when a vehicle speed is below a predetermined threshold speed.

Example 3: The pneumatic arrangement of any one of examples 1 or 2, wherein the at least one valve of the second valve arrangement is a normally open solenoid valve.

Example 4: The pneumatic arrangement of any one of the preceding examples, wherein the second valve arrangement comprises a second valve, the second valve being a relay valve arranged in fluid communication between the at least one valve and the trailer parking brake outlet.

Example 5: The pneumatic arrangement of example 4, wherein the relay valve is configured to fluidly connect the trailer parking brake outlet to the air outlet when the relay valve assumes a closed position.

Example 6: The pneumatic arrangement of any one of the preceding examples, wherein the first valve arrangement comprises a first set of valves and a release valve, wherein the tractor parking brake outlet is arranged in fluid communication with the air outlet via the release valve when the pneumatic arrangement assumes the parking brake mode.

Example 7: The pneumatic arrangement of any one of the preceding examples, wherein, upon de-activation of the manually controllable brake actuator, the first valve arrangement is controlled to disconnect the tractor parking brake outlet from the air outlet, and the second valve arrangement is controlled to disconnect the trailer parking brake outlet from the air outlet.

Example 8: The pneumatic arrangement of any one of the preceding examples, wherein the pneumatic arrangement further comprises a trailer service brake outlet connectable to a pneumatically controlled service brake cylinder of the trailer unit.

Example 9: The pneumatic arrangement of example 8, wherein the trailer service brake outlet is connected to the first valve arrangement.

Example 10: The pneumatic arrangement of example 9, wherein the pneumatic arrangement is configured to assume a secondary brake mode in which the first valve arrangement is controlled to direct pressurized fluid from the trailer service brake outlet.

Example 11: The pneumatic arrangement of example 10, wherein the first valve arrangement is controlled to arrange the tractor parking brake outlet in fluid communication with the air outlet when the pneumatic arrangement assumes the secondary brake mode.

Example 12: The pneumatic arrangement of any one of examples 10-11 when dependent on example 3, wherein the normally open solenoid valve is controlled to assume a closed position when the pneumatic arrangement assumes the secondary brake mode.

Example 13: The pneumatic arrangement of any one of examples 10-12 when dependent on example 4, wherein the relay valve is controlled to assume an open position to maintain an air pressure in the trailer parking brake outlet when the pneumatic arrangement assumes the secondary brake mode.

Example 14: The pneumatic arrangement of any one of examples 10-13, wherein the pneumatic arrangement is configured to assume the secondary brake mode upon actuation of the manually controllable brake actuator when a vehicle speed is above a predetermined threshold speed.

Example 15: The pneumatic arrangement of any one of the preceding examples, wherein the pneumatic arrangement further comprises a pressure sensor connected to the trailer parking brake outlet.

Example 16: The pneumatic arrangement of example 15 when dependent on example 12, wherein the pressure sensor is configured to transmit a signal to an upper layer control unit when a pressure level in the trailer parking brake outlet exceeds a predetermined threshold limit during the secondary brake mode.

Example 17: The pneumatic arrangement of any one of the preceding examples, wherein the first valve arrangement is an electrically controlled valve arrangement operable upon receiving an electronic control signal.

Example 18: The pneumatic arrangement of any one of the preceding examples, wherein the second valve arrangement is an electrically controlled valve arrangement operable upon receiving an electronic control signal upon manual actuation by the manually controllable actuator.

Example 19: A braking system for a vehicle, the braking system comprises a pneumatic arrangement according to any one of the preceding examples, at least one trailer parking brake comprising a pneumatically controlled parking brake cylinder connected to the trailer parking brake outlet, and at least one tractor parking brake comprising a pneumatically controlled parking brake cylinder connected to the tractor parking brake outlet.

Example 20: A vehicle comprising a braking system of example 19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A pneumatic arrangement for a braking system of a vehicle comprising a tractor unit and at least one trailer unit, the pneumatic arrangement comprising:

a manually controllable brake actuator;

a trailer parking brake outlet connectable to a pneumatically controlled parking brake cylinder of the at least one trailer unit;

a tractor parking brake outlet connectable to a pneumatically controlled parking brake cylinder of the tractor unit;

a first valve arrangement connected to, and controllable by, the manually controllable brake actuator, the first valve arrangement comprising at least one valve connected to the trailer parking brake outlet, the tractor parking brake outlet, an air inlet and an air outlet of the pneumatic arrangement; and a second valve arrangement connected to, and controllable by, the manually controllable brake actuator, the second valve arrangement comprising at least one valve connected to the air outlet of the pneumatic arrangement and connected between the first valve arrangement and the trailer parking brake outlet;

wherein, upon actuation of the manually controllable brake actuator, the pneumatic arrangement is operable to assume a parking brake mode in which the first valve arrangement is controlled to arrange the tractor parking brake outlet in fluid communication with the air outlet, and the second valve arrangement is controlled to arrange the trailer parking brake outlet in fluid communication with the air outlet.

2. The pneumatic arrangement of claim 1, wherein the pneumatic arrangement is operable to assume the parking brake mode upon actuation of the manually controllable brake actuator when a vehicle speed is below a predetermined threshold speed.

3. The pneumatic arrangement of claim 1, wherein the at least one valve of the second valve arrangement is a normally open solenoid valve.

4. The pneumatic arrangement of claim 1, wherein the second valve arrangement comprises a second valve, the second valve being a relay valve arranged in fluid communication between the at least one valve and the trailer parking brake outlet.

5. The pneumatic arrangement of claim 4, wherein the relay valve is configured to fluidly connect the trailer parking brake outlet to the air outlet when the relay valve assumes a closed position.

6. The pneumatic arrangement of claim 1, wherein the first valve arrangement comprises a first set of valves and a release valve, wherein the tractor parking brake outlet is arranged in fluid communication with the air outlet via the release valve when the pneumatic arrangement assumes the parking brake mode.

7. The pneumatic arrangement of claim 1, wherein, upon de-activation of the manually controllable brake actuator, the first valve arrangement is controlled to disconnect the tractor parking brake outlet from the air outlet, and the second valve arrangement is controlled to disconnect the trailer parking brake outlet from the air outlet.

8. The pneumatic arrangement of claim 1, wherein the pneumatic arrangement further comprises a trailer service brake outlet connectable to a pneumatically controlled service brake cylinder of the trailer unit.

9. The pneumatic arrangement of claim 8, wherein the trailer service brake outlet is connected to the first valve arrangement.

10. The pneumatic arrangement of claim 9, wherein the pneumatic arrangement is configured to assume a secondary brake mode in which the first valve arrangement is controlled to direct pressurized fluid from the trailer service brake outlet.

11. The pneumatic arrangement of claim 10, wherein the first valve arrangement is controlled to arrange the tractor parking brake outlet in fluid communication with the air outlet when the pneumatic arrangement assumes the secondary brake mode.

12. The pneumatic arrangement of claim 10:

wherein the at least one valve of the second valve arrangement is a normally open solenoid valve; and wherein the normally open solenoid valve is controlled to assume a closed position when the pneumatic arrangement assumes the secondary brake mode.

13. The pneumatic arrangement of claim 10:

wherein the second valve arrangement comprises a second valve, the second valve being a relay valve arranged in fluid communication between the at least one valve and the trailer parking brake outlet; and wherein the relay valve is controlled to assume an open position to maintain an air pressure in the trailer parking brake outlet when the pneumatic arrangement assumes the secondary brake mode.

14. The pneumatic arrangement of claim 10, wherein the pneumatic arrangement is configured to assume the secondary brake mode upon actuation of the manually controllable brake actuator when a vehicle speed is above a predetermined threshold speed.

15. The pneumatic arrangement of claim 1, wherein the pneumatic arrangement further comprises a pressure sensor connected to the trailer parking brake outlet.

16. The pneumatic arrangement of claim 15:

wherein the at least one valve of the second valve arrangement is a normally open solenoid valve;

wherein the normally open solenoid valve is controlled to assume a closed position when the pneumatic arrangement assumes the secondary brake mode; and wherein the pressure sensor is configured to transmit a signal to an upper layer control unit when a pressure level in the trailer parking brake outlet exceeds a predetermined threshold limit during the secondary brake mode.

17. The pneumatic arrangement of claim 1, wherein the first valve arrangement is an electrically controlled valve arrangement operable upon receiving an electronic control signal.

18. The pneumatic arrangement of claim 1, wherein the second valve arrangement is an electrically controlled valve arrangement operable upon receiving an electronic control signal upon manual actuation by the manually controllable actuator.

19. A braking system for a vehicle, the braking system comprises a pneumatic arrangement according to any one of the preceding claims, at least one trailer parking brake comprising a pneumatically controlled parking brake cylinder connected to the trailer parking brake outlet, and at least one tractor parking brake comprising a pneumatically controlled parking brake cylinder connected to the tractor parking brake outlet.

20. A vehicle comprising the braking system of claim 19.

* * * * *